US009784141B2

United States Patent
Zhou (10) Patent No.: US 9,784,141 B2
(45) Date of Patent: Oct. 10, 2017

(54) METHOD AND SYSTEM OF CONTROLLING A THERMODYNAMIC SYSTEM IN A VEHICLE

(71) Applicant: Ford Global Technologies, LLC, Dearborn, MI (US)

(72) Inventor: Shiguang Zhou, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 14/596,528

(22) Filed: Jan. 14, 2015

(65) Prior Publication Data

US 2016/0201520 A1    Jul. 14, 2016

(51) Int. Cl.
| | | |
|---|---|---|
| *F01K 23/10* | (2006.01) | |
| *F01K 23/06* | (2006.01) | |
| *F01N 5/02* | (2006.01) | |
| *B60R 16/08* | (2006.01) | |
| *F01K 1/12* | (2006.01) | |

(52) U.S. Cl.
CPC ............ *F01K 23/101* (2013.01); *B60R 16/08* (2013.01); *F01K 23/065* (2013.01); *F01N 5/02* (2013.01); *Y02T 10/16* (2013.01); *Y02T 10/166* (2013.01); *Y10S 903/904* (2013.01)

(58) Field of Classification Search
CPC ........ F01K 23/10; F01K 23/101; F01K 23/65; B60R 16/08; F01N 5/00; F01N 5/22; Y02T 10/16; Y02T 10/166; Y10S 903/904
USPC ........................................... 60/616–618, 659
See application file for complete search history.

(56) References Cited

U.S. PATENT DOCUMENTS

| | | | | |
|---|---|---|---|---|
| 3,818,697 A | * | 6/1974 | Gilli .......................... | F01K 3/12 122/35 |
| 3,890,789 A | * | 6/1975 | Beckmann ................ | F01K 3/04 122/35 |
| 4,479,352 A | * | 10/1984 | Yamaoka .................. | F01K 3/00 60/652 |
| 4,576,009 A | * | 3/1986 | Ogushi ................. | F25B 23/006 105/29.1 |
| 5,000,003 A | | 3/1991 | Wicks | |

(Continued)

FOREIGN PATENT DOCUMENTS

| | | | | |
|---|---|---|---|---|
| DE | 102014206038 A1 | * | 10/2015 | ............. F02B 75/04 |
| JP | 08005201 A | * | 1/1996 | |
| JP | 2008231981 A | * | 10/2008 | |

OTHER PUBLICATIONS

JP 08005201 A English Translation.*
JP 2008231981 A English Translation.*

*Primary Examiner* — Phutthiwat Wongwian
*Assistant Examiner* — Jessica Kebea
(74) *Attorney, Agent, or Firm* — Brooks Kushman P.C.; Greg Brown (57) ABSTRACT

A vehicle has a vehicle system with a waste heat fluid. An expander, a condenser, a pump, and an evaporator are provided in sequential fluid communication in a thermodynamic cycle containing a working fluid. The evaporator is configured to transfer heat from the waste heat fluid to the working fluid. At least one valve adjacent to the pump is controlled to control fluid flow through at least one chamber to maintain a pressure of the fluid at a pump inlet at a threshold pressure above a saturated vapor pressure associated with a temperature at a condenser outlet when ambient temperature varies.

16 Claims, 3 Drawing Sheets

(56) References Cited

U.S. PATENT DOCUMENTS

| | | | | |
|---|---|---|---|---|
| 5,454,408 A * | 10/1995 | DiBella | ............ | F04B 9/1176 141/18 |
| 6,000,230 A * | 12/1999 | Kanno | ............ | F17C 7/00 137/208 |
| 6,035,643 A | 3/2000 | Rosenblatt | | |
| 6,829,894 B2 * | 12/2004 | Bloch | ............ | F01K 13/00 60/646 |
| 7,594,399 B2 * | 9/2009 | Lehar | ............ | F01K 25/06 60/649 |
| 7,997,079 B2 * | 8/2011 | Seidel | ............ | F28D 20/0039 60/645 |
| 8,613,195 B2 | 12/2013 | Held et al. | | |
| 8,627,663 B2 * | 1/2014 | Ernst | ............ | F01K 9/003 60/616 |
| 8,713,939 B2 * | 5/2014 | Tsuchino | ............ | F01K 13/02 60/615 |
| 8,826,662 B2 * | 9/2014 | Ernst | ............ | F01N 5/02 60/618 |
| 9,021,807 B2 * | 5/2015 | Gaertner | ............ | F01K 13/02 60/615 |
| 2010/0287920 A1 * | 11/2010 | Duparchy | ............ | F01K 13/02 60/320 |
| 2012/0076294 A1 * | 3/2012 | Koo | ............ | H04L 9/0631 380/44 |
| 2012/0144804 A1 * | 6/2012 | Mendez | ............ | F01N 3/2006 60/274 |
| 2012/0291418 A1 * | 11/2012 | Rusche | ............ | F01K 15/02 60/273 |
| 2013/0074531 A1 * | 3/2013 | Parsonnet | ............ | F25D 16/00 62/117 |
| 2013/0192225 A1 * | 8/2013 | Rewers | ............ | F01K 3/08 60/618 |
| 2013/0199173 A1 | 8/2013 | Voss et al. | | |
| 2015/0135708 A1 * | 5/2015 | Lutz | ............ | F01K 23/065 60/618 |
| 2015/0275778 A1 * | 10/2015 | Fast | ............ | F02B 75/04 123/48 R |
| 2015/0300210 A1 * | 10/2015 | Smague | ............ | F01K 9/023 60/645 |

* cited by examiner

METHOD AND SYSTEM OF CONTROLLING A THERMODYNAMIC SYSTEM IN A VEHICLE

TECHNICAL FIELD

Various embodiments related to controlling a thermodynamic system, such as a Rankine cycle, in a vehicle for waste heat energy recovery.

BACKGROUND

Vehicles, including hybrid vehicles, have internal combustion engines that produce exhaust gases at a high temperature. The vehicle also may have various systems with waste heat and requiring cooling, e.g. the engine coolant system with coolant fluid. A thermodynamic cycle such as a Rankine cycle may be used to recover waste heat within the vehicle during operation using a heat exchanger. The cycle may need to be controlled to meet predetermined operating parameters, and this may be challenging for a vehicle application with a variable ambient environment.

SUMMARY

In an embodiment, a vehicle is provided with a vehicle system having a waste heat fluid. An expander, a condenser, a pump, and an evaporator are provided in sequential fluid communication in a thermodynamic cycle containing a working fluid. The evaporator is configured to transfer heat from the waste heat fluid to the working fluid. A chamber is connected to an inlet of the pump by an upstream valve, and connected to an outlet of the pump by a downstream valve. A controller is configured to control the upstream valve and the downstream valve such that a pressure of the working fluid at the inlet to the pump is at a threshold pressure. The threshold pressure is a saturated vapor pressure of the working fluid plus a pressure offset. The saturated vapor pressure is a function of a temperature of the working fluid at an outlet of the condenser. The temperature and the saturated vapor pressure vary with ambient temperature.

In another embodiment, a vehicle is provided with a vehicle system having a waste heat fluid. An expander, a condenser, a pump, and an evaporator are provided in sequential fluid communication in a thermodynamic cycle containing a working fluid. The evaporator is configured to transfer heat from the waste heat fluid to the working fluid. A plurality of chambers are arranged in parallel fluid connection and positioned between the condenser and the pump. At least one valve is in fluid communication with the plurality of chambers and configured to selectively control flow of the working fluid between the plurality of chambers. A controller is configured to control the at least one valve to vary a volume of the cycle such that a pressure of the working fluid at an inlet to the pump is at a threshold pressure. The threshold pressure is a saturated vapor pressure of the working fluid plus a pressure offset. The saturated vapor pressure is a function of a temperature of the working fluid at an outlet of the condenser. The temperature and the saturated vapor pressure vary with ambient temperature.

In yet another embodiment, a method is provided for controlling a pump, an evaporator, an expander, and a condenser in a closed loop in a vehicle for waste heat energy recovery using a mixed phase working fluid. At least one valve adjacent to the pump is controlled to maintain a pressure of the fluid at a pump inlet at a threshold pressure above a saturated vapor pressure associated with a temperature at a condenser outlet when ambient temperature varies.

Various examples of the present disclosure have associated, non-limiting advantages. For example, a thermodynamic cycle in a vehicle may be used to recover waste heat and energy and increase vehicle efficiency. The thermodynamic cycle may be a Rankine cycle. The vehicle operates in varying ambient conditions, and these ambient conditions, e.g. ambient or environmental temperature, may rapidly change over a wide range of temperatures. The operating conditions of the thermodynamic cycle may need to be modified as the ambient conditions change to maintain efficient operation of the cycle. For example, the temperature of the working fluid at the outlet of the condenser is a temperature above the ambient temperature, and the pressure of the working fluid at the condenser outlet (pump inlet) is at a pressure offset above the saturated vapor pressure associated with the temperature at the condenser outlet. In one example, the cycle has a pressure chamber or reservoir positioned in parallel with the pump and fluidly connected to the pump inlet and outlet by respective valves. By controlling the valves, the pressure in the cycle may be increased or decreased to account for changes in ambient temperature. In one example, the cycle has a plurality of chamber positioned in parallel with one another and upstream of the pump, with one or more valves to control the flow of the working fluid through each of the chambers. By controlling the valves, the volume may be increased or decreased to provide a decreased or increased pressure of the cycle, respectively, and to account for changes in ambient temperature.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Description of constituents in chemical terms refers to the constituents at the time of addition to any combination specified in the description, and does not necessarily preclude chemical interactions among constituents of the mixture once mixed. A fluid as described in the present disclosure may refer a substance in various states or phases including to vapor phase, liquid phase, mixed vapor/liquid phase, superheated gases, sub-cooled liquids, and the like.

A Rankine cycle may be used to convert thermal energy into mechanical or electrical power. Efforts have been made to collect thermal energy more effectively or from more than one system that rejects waste heat in the vehicle such as engine coolant, engine or transmission oil, exhaust gas recirculation (EGR) gases, exhaust gases, etc. The present disclosure provides for a Rankine cycle with an evaporator that provides for phase separation as the working fluid evaporates, thereby increasing the cycle efficiency and maintaining a generally even temperature distribution of the liquid and vapor phases of the working fluid in the evaporator.

Figure 1:
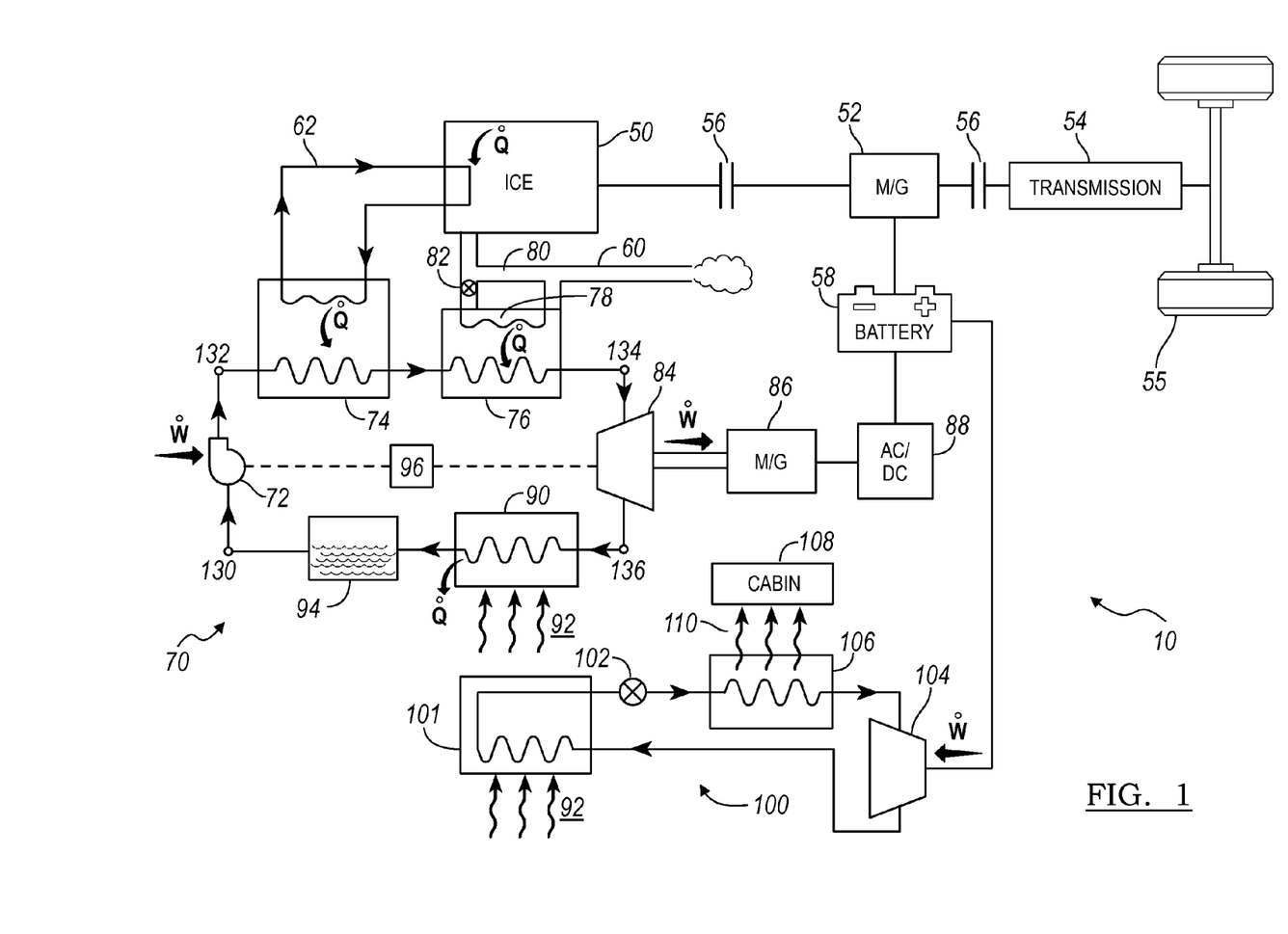
FIG. 1 illustrates a schematic of systems of a vehicle according to an embodiment.

FIG. 1 illustrates a simplified schematic of various systems within a vehicle 10 according to an example. Fluids in various vehicle systems may be cooled via heat transfer to a working fluid within heat exchangers of a Rankine cycle, and the working fluid is in turn cooled in a condenser of the Rankine cycle using ambient air. The Rankine cycle allows for energy recovery by converting waste heat in the vehicle to electrical power or mechanical power that would otherwise be transferred to ambient air.

The vehicle may be a hybrid vehicle with multiple sources of torque available to the vehicle wheels. In other examples, the vehicle is a conventional vehicle with only an engine, or is an electric vehicle with only electric machine(s). In the example shown, the vehicle has an internal combustion engine 50 and an electric machine 52. The electric machine 52 may be a motor or a motor/generator. The engine 50 and the electric machine 52 are connected via a transmission 54 to one or more vehicle wheels 55. The transmission 54 may be a gearbox, a planetary gear system, or other transmission. Clutches 56 may be provided between the engine 50, the electric machine 52, and the transmission 54. The powertrain may be configured in various manners including as a parallel, a series, or a series-parallel hybrid vehicle.

The electric machine 52 receives electrical power to provide torque to the wheels 55 from a traction battery 58. The electric machine 52 may also be operated as a generator to provide electrical power to charge the battery 58, for example, during a braking operation.

The engine 50 may be an internal combustion engine such as a compression ignition engine or spark ignition engine. The engine 50 has an exhaust system 60 through which exhaust gases are vented from cylinders in the engine 50 to atmosphere. The exhaust system 60 may include a muffler for noise control. The emissions system 60 may also include an emissions system, such as a catalytic converter, particulate filter, and the like.

The engine 50 also has a coolant system 62. The coolant system contains an engine coolant fluid, which may include water, glycol, and/or another fluid, to remove heat from the engine 50 during operation. The engine 50 may be provided with an internal or external cooling jacket with passages to remove heat from various regions of the engine 50 using the recirculating engine coolant fluid. The coolant system 62 may include a pump and a reservoir (not shown).

The vehicle has a thermodynamic cycle 70. In one example, the cycle 70 is a Rankine cycle. In another example, the cycle 70 is a modified Rankine cycle, or another thermodynamic cycle that includes a working fluid transitioning through more than one phase during cycle operation. The Rankine cycle 70 contains a working fluid. In one example, the working fluid undergoes phase change and is a mixed phase fluid within the system. The working fluid may be R-134a, R-245, or another organic or inorganic chemical refrigerant based on the desired operating parameters of the cycle.

The cycle 70 has a pump 72, compressor, or other device configured to increase the pressure of the working fluid. The pump 72 may be a centrifugal pump, a positive displacement pump, etc. The working fluid flows from the pump 72 to one or more heat exchangers. The heat exchangers may be preheaters, evaporators, superheaters, and the like configured to transfer heat to the working fluid.

The example shown has a first heat exchanger 74, which is configured as a preheater. A second heat exchanger 76 is provided, and may be configured as an evaporator. In other examples, greater or fewer heat exchangers may be provided downstream of the pump 72. For example, the cycle 70 may be provided only with heat exchanger 76, or may be provided with three or more heat exchangers to heat the working fluid. Additionally, the heat exchangers downstream of the pump 72 may be arranged or positioned in various manners relative to one another, for example, in parallel, in series as shown, or in a combination of series and parallel flows.

The heat exchangers 74, 76 are configured to transfer heat from an outside heat source to heat the working fluid within the cycle 70. In the example shown, the heat exchanger 74 is configured to transfer heat from the engine coolant fluid in coolant loop 62 to the working fluid in the cycle 70. The temperature of the engine coolant is therefore reduced before returning to the engine 50 to remove heat therefrom and heat exchanger 74 acts as a heat sink in the coolant system 62. The temperature of the working fluid of the cycle 70 is likewise increased within the heat exchanger 74.

In other examples, as discussed in greater detail below, the heat exchanger 74 is configured to transfer heat to the working fluid of the cycle 70 from another fluid in a vehicle system, including, but not limited to, an engine lubrication fluid, a transmission lubrication fluid, and a battery cooling fluid. In a further example, multiple preheating heat exchangers 74 are provided and are each in fluid communication with a separate vehicle system to receive heat therefrom. Valving, or another flow control mechanism may be provided to direct and control flow to the multiple heat exchangers.

In another example, the heat exchanger 74 is positioned downstream of the heat exchanger 76 such that it is configured as a superheater, and transfers heat from a fluid from various vehicle systems, including, but not limited to, exhaust gas recirculation (EGR) flow. The heat exchanger 74 provides a heat sink for the EGR flow, and thereby provides waste heat to the working fluid in the cycle 70. The positioning of the heat exchanger 74 relative to heat exchanger 76 may be based on an average temperature or available heat in the fluids of the vehicle systems.

A second heat exchanger 76 is also provided in the cycle 70. The heat exchanger 76 is configured to transfer heat to the working fluid of the cycle from exhaust gases in the engine exhaust system 60 in one example. The engine exhaust system 60 may have a first flow path 78 through or in contact with the heat exchanger 76. The engine exhaust system 60 may also have a second, or bypass, flow path 80 to divert exhaust gas flow around the heat exchanger 76. A valve 82 may be provided to control the amount of exhaust gas flowing through the heat exchanger 76, which in turn provides a control over the amount of heat transferred to the working fluid, and the temperature and state of the working fluid at the exit of the heat exchanger 76 or upstream of the expander 84.

At least one of the heat exchangers 74, 76 is configured to transfer sufficient heat to the working fluid in the cycle 70 to evaporate the working fluid, as discussed further below. The evaporator receives the working fluid in a liquid phase or liquid vapor mixed phase solution, and heats the working fluid to a vapor phase or superheated vapor phase. The disclosure generally describes using heat exchanger 76 as an evaporator using the engine exhaust 60; however, other vehicle systems may be used with heat exchanger in the cycle 70 acting as the evaporator.

The expander 84 may be a turbine, such as a centrifugal or axial flow turbine, or another similar device. The expander 84 is rotated by the working fluid to produce work as the working fluid expands. The expander 84 may be connected to a motor/generator 86 to rotate the motor/generator to generate electrical power, or to another mechanical linkage to provide additional power to the driveshaft and wheels 55. The expander 84 may be connected to the generator 86 by a shaft or another mechanical linkage. The generator 86 is connected to the battery 58 to provide electrical power to charge the battery 58. An inverter or AC-DC converter 88 may be provided between the generator 84 and the battery 58.

The working fluid leaves the expander 84 and flows to a heat exchanger 90, also referred to as a condenser 90 in the cycle 70. The condenser 90 may be positioned in a front region of the vehicle 10. The condenser 90 is configured to be in contact with an ambient air flow 92 such that heat is transferred from the working fluid to the ambient air flow to remove heat from the working fluid and cool and/or condense the working fluid. The condenser 90 may be a single stage or multiple stages, and the flow of the working fluid may be controllable through the various stages as required by the cycle 70 using valves or other mechanisms.

In some examples, the cycle 70 includes a fluid accumulator 94 or dryer. The accumulator 94 may be provided as a fluid or liquid reservoir for the working fluid in the cycle 70. The pump 72 draws fluid from the accumulator 94 to complete the cycle 70. As can be seen from FIG. 1, the cycle 70 is a closed loop cycle such that the working fluid does not mix with other fluids in the vehicle or with ambient air.

The cycle 70 may include a controller 96 that is configured to operate the cycle within predetermined parameters as described below. The controller 96 may be incorporated with or be in communication with an engine control unit (ECU), a transmission control unit (TCU), a vehicle system controller (VSC), or the like, and may also be in communication with various vehicle sensors. The control system for the vehicle 10 may include any number of controllers, and may be integrated into a single controller, or have various modules. Some or all of the controllers may be connected by a controller area network (CAN) or other system. The controller 96 and the vehicle control system may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle or the cycle 70.

The vehicle may also be provided with an air conditioning system 100 in one or more embodiments. The air conditioning system 100 may form a part of a heating, ventilation, and air conditioning (HVAC) system for the vehicle. The HVAC system provides air at a controlled temperature to the vehicle or passenger cabin for cabin climate control by the vehicle occupants. The air conditioning system 100 has a first heat exchanger 101 or condenser in contact with the ambient air 92. The condenser 101 may be positioned in the front region of the vehicle 10. The condenser 101 is configured for heat transfer between ambient air and a refrigerant or other fluid in the system 100.

The air conditioning system 100 may also include an expansion device, valve, or throttle 102, and a compressor or pumping device 104. The system 100 has another heat exchanger 106 in contact with air flow 110 to be directed to the vehicle cabin 108, and the refrigerant in the system 100. Air flow 110, which is intended for cabin conditioning, flows over and is cooled by refrigerant in the heat exchanger 106, and then flows to the cabin 108 as required by the vehicle occupants.

Figure 2:
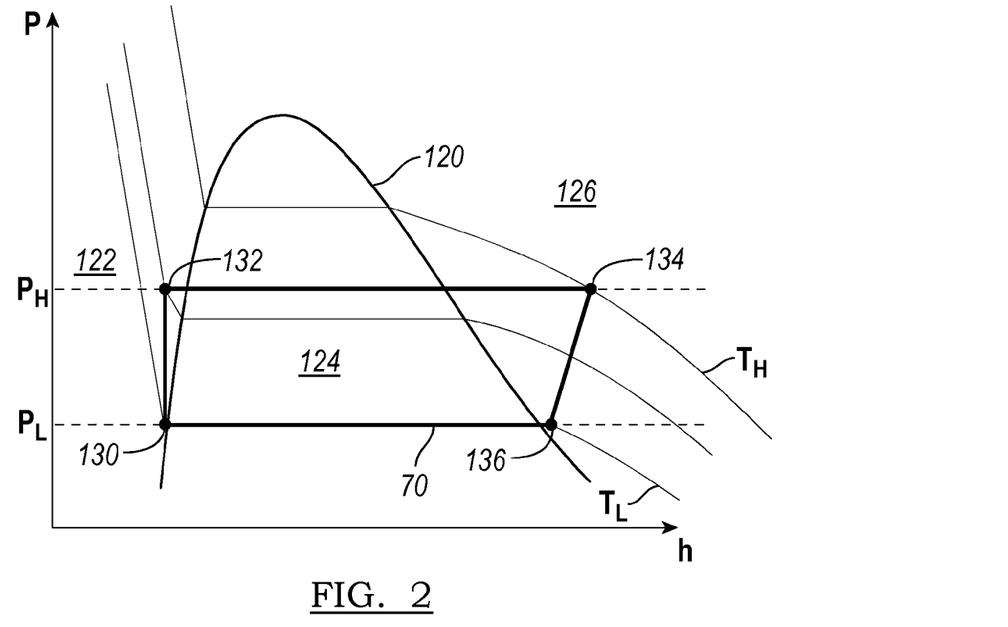
FIG. 2 illustrates a simplified pressure-enthalpy diagram for the Rankine cycle of FIG. 1.
Figure 3:
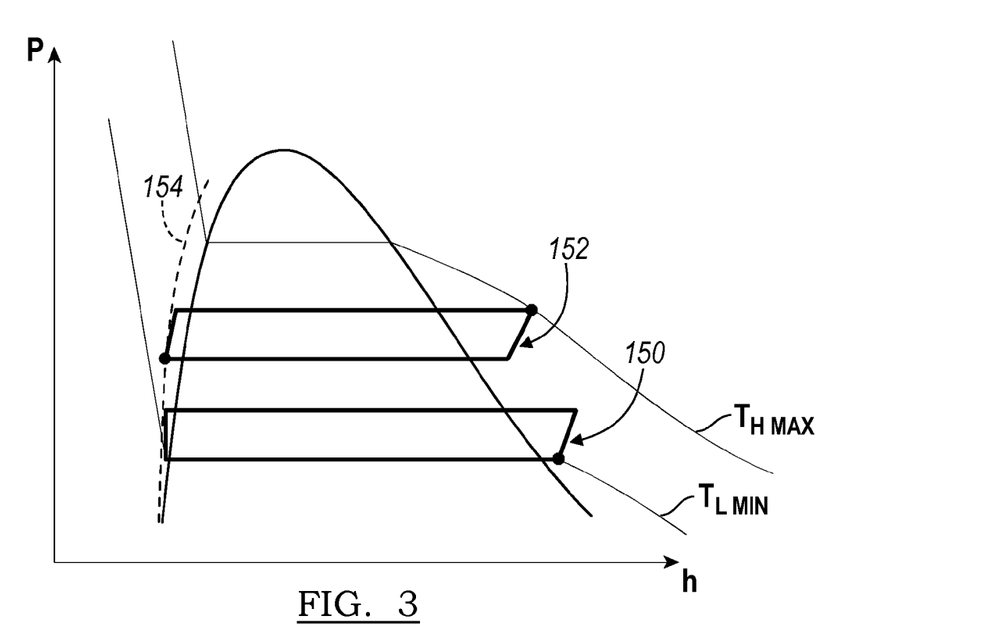
FIG. 3 illustrates a simplified pressure-enthalpy diagram for the Rankine cycle of FIG. 1 at various operating conditions.

The Rankine or thermodynamic cycle 70 as shown in FIG. 2 is illustrated on a pressure-enthalpy (P-h) chart for the working fluid in FIG. 3. The chart has pressure (P) on the vertical axis and enthalpy (h) on the horizontal axis. Enthalpy may have units of energy per unit mass, e.g. kJ/kg.

The dome 120 provides a separation line between the various phases of the working fluid. The working fluid is a liquid or sub-cooled liquid in region 122 to the left of the dome 120. The working fluid is a vapor or superheated vapor in region 126 to the right of the dome 120. The working fluid is a mixed phase, e.g. a mixture of liquid and vapor phase, in region 124 underneath the dome 120. Along the left hand side of the dome 120, where region 122 and 124 meet, the working fluid is a saturated liquid. Along the right hand side of the dome 120, where region 124 and 126 meet, the working fluid is a saturated vapor.

The Rankine cycle 70 of FIG. 2 is illustrated on the chart according to an embodiment. The charted cycle 70 is simplified for the purposes of this disclosure, and any losses in the cycle 70 or system are not illustrated although they may be present in actual applications. Losses may include pumping losses, pipe losses, pressure and friction losses, heat loss through various components, and other irreversibilities in the system. The operation of the cycle 70 as shown in FIG. 3 in simplified to assume constant pressure, and adiabatic, reversible, and/or isentropic process steps as appropriate and as described below; however, one of ordinary skill in the art would recognize that the cycle 70 may vary from these assumptions in a real-world application. The cycle is charted as operating between a high pressure, $P_H$, and a low pressure, $P_L$. Constant temperature lines are shown on the chart as well, e.g. $T_H$ and $T_L$.

The cycle 70 begins at point 130 where the working fluid enters the pump 72. The working fluid is a liquid at 130, and may be sub-cooled to a temperature of 2-3 degrees Celsius or more below the saturation temperature at $P_L$. The working fluid leaves the pump 72 at point 132 at a higher pressure, $P_H$, and in a liquid phase. In the example shown, the pumping process from 130 to 132 is modeled as being isentropic, or adiabatic and reversible.

The working fluid enters one or more heat exchangers at 132, for example, heat exchangers 74, 76. The working fluid is heated within the heat exchangers 74, 76 using waste heat from a fluid in a vehicle system. In the example shown, the working fluid is heated using engine coolant and exhaust gas. The working fluid leaves the heat exchangers at point 134. The heating process from 132 to 134 is modeled as a constant pressure process. As can be seen from the Figure, the process from 132 to 134 occurs at $P_H$, and the temperature increases to $T_H$ at 134. The working fluid begins in a liquid phase at 132 and leaves the heat exchangers 74, 76 in a superheated vapor phase at 134. In the example shown, the working fluid enters heat exchanger 76 as a mixed liquid-vapor phase fluid, and leaves the heat exchanger 76 in the vapor phase.

The working fluid enters an expander 84, such as a turbine, at point 134 as a superheated vapor. The working fluid drives or rotates the expander as it expands to produce work. The working fluid exits the expander 84 at point 136 at a pressure, $P_L$. The working fluid may be a superheated vapor at 136, as shown. In other examples, the working fluid may be a saturated vapor or may be mixed phase and in region 124 after exiting the expander 84. In a further example, the working fluid is within a few degrees Celsius of the saturated vapor line on the right hand side of dome 120. In the example shown, the expansion process from 134 to 136 is modeled as isentropic, or adiabatic and reversible. The expander 84 causes a pressure drop and a corresponding temperature drop across the device as the working fluid expands.

The working fluid enters one or more heat exchangers at 136, for example, heat exchanger 90. The working fluid is cooled within the heat exchanger 90 using ambient air received through the frontal region of the vehicle. The working fluid leaves the heat exchanger at point 130, and then flows to the pump 72. An accumulator may also be included in the cycle 70. The cooling process from 136 to 130 is modeled as a constant pressure process. As can be seen from the Figure, the process from 136 to 130 occurs at $P_L$. The temperature of the working fluid may decrease within the heat exchanger 90. The working fluid begins as a superheated vapor or vapor-liquid mixed phase at 136 and leaves the heat exchanger 90 as a liquid at 130.

In one example, the cycle 70 is configured to operate with a pressure ratio of $P_H$ to $P_L$ of approximately 3, or in a further example, with a pressure ratio of approximately 2.7. In other examples, the pressure ratio may be higher or lower. The cycle 70 may be adapted to operate in various ambient environments as required by the vehicle and its surrounding environment. In one example, the cycle 70 is configured to operate across a range of possible ambient temperatures. The ambient temperature may provide a limit to the amount of cooling available for the working fluid in the heat exchanger 90. In one example, the cycle 70 may be operated between an ambient or environmental temperature of −25 degrees Celsius and 40 degrees Celsius. In other examples, the cycle 70 may operate at higher and/or lower ambient temperatures.

The power provided by the cycle 70 may be a function of the mass flow rate of the waste heat fluid, the temperature of the waste heat fluid, the temperature of the working fluid at point 134, and the mass flow rate of ambient air. For example, with exhaust gas providing the sole source of waste heat, the power provided by the cycle 70 is a function of the mass flow rate of exhaust gas through the heat exchanger 76, the temperature of the exhaust gas entering heat exchanger 76, the temperature of the working fluid at point 134, and the mass flow rate of ambient air. For systems with more than one waste heat source, the mass flow rates and temperatures of each source would also be included for the power provided by the cycle 70. In one example, the power out of the cycle 70 was on the order of 0.5-1.5 kW, and in a further example, was approximately 1 kW for a cycle with exhaust temperatures ranging from 500-800 degrees Celsius, and an exhaust gas mass flow rate ranging from 50-125 kg/hr.

The efficiency of the cycle 70 with respect to the vehicle may be determined based on the electric power produced by the generator 86, and a rate of heat transfer available from the waste heat sources, e.g. engine exhaust, engine coolant, etc. The rate of heat available is a function of the mass flow rate of the waste heat fluid through the associated cycle heat exchanger and the temperature difference of the waste heat fluid across the heat exchangers. In one example, the cycle efficiency was measured to be above 5% on average using exhaust gas heat only, and in a further example, the cycle efficiency was measured to be above 8% on average for a cycle using exhaust gas waste heat only.

Maintaining the state or phase of the working fluid at specific operation points within the cycle 70 may be critical for system operation and maintaining system efficiency. For example, one or both of the heat exchangers 74, 76 may need to be designed for use with a liquid phase, a mixed phase fluid, and a vapor phase fluid. The working fluid may need to be a liquid phase at point 130 in the cycle to prevent air lock within the pump 72. Additionally, it may be desirable to maintain the working fluid as a vapor between points 134 and 136 based on the expander 84 construction, as a mixed phase may reduce system efficiencies or provide wear on the device 84. Based on the ambient air temperature, and the speed of the vehicle, which controls the ambient air flow rate, the amount and/or rate of cooling that is available to the working fluid within the heat exchanger 90 may also be limited. Furthermore, the amount and/or rate of heat available to heat the working fluid may be limited at vehicle start up when the engine exhaust and/or engine coolant has not reached their operating temperatures.

The cycle 70 may be operated at various operating conditions, as shown in FIG. 3. FIG. 3 illustrates two operating conditions for the cycle 70. Cycle 150 is shown operating at or near a minimum ambient air operating temperature, $T_{L,min}$. Cycle 152 is shown operating at or near a maximum ambient air operating temperature, $T_{H,max}$. The working fluid is selected based the cycles and operating states of the various points in the cycle, and the constraints imposed by these operating states.

Additionally, the cycle 70 may be controlled to operate within a desired temperature and pressure range by modifying the flow rate of exhaust gas or other waste heat source through the heat exchangers 74, 76, thereby controlling the amount of heat transferred to the working fluid and its temperature at point 134. The heat exchanger 90 may also be controlled by providing additional stages, or limiting stages for working fluid to flow through based on the ambient air temperature, flow rate, and humidity, thereby controlling the amount of cooling and the working fluid temperature at point 130. Additionally, the flow rate of the working fluid may be controlled by the pump 72, such that the working fluid has a longer or shorter residence time in each heat exchanger 90, 74, 76, thereby controlling the amount of heat transferred to or from the working fluid.

Figure 4:
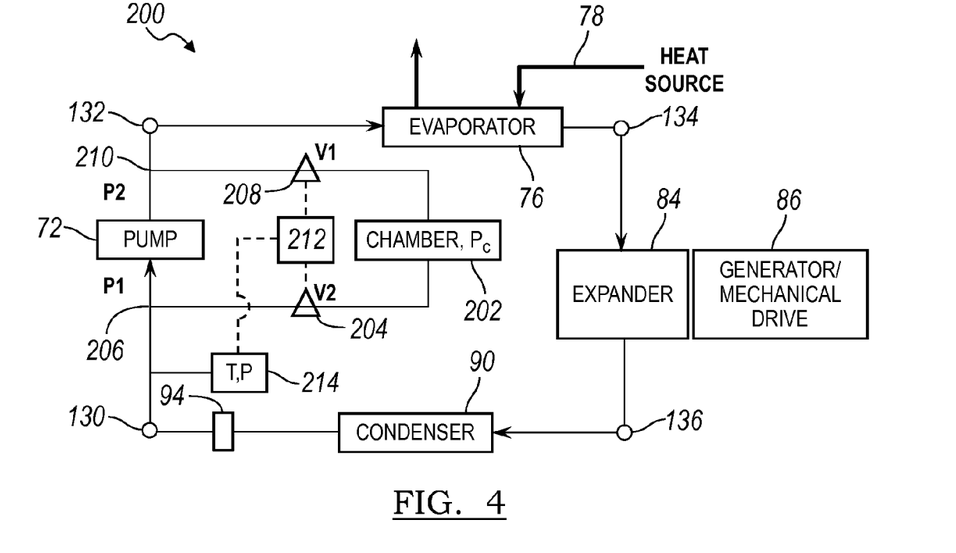
FIG. 4 illustrates a schematic of a simplified Rankine cycle with a pressure control device according to an embodiment.

FIG. 4 illustrates an example of a cycle for a vehicle that is configured for use in varying ambient temperatures. The cycle 200 is shown as a simplified cycle, and in one example may be a cycle 70 as described above and used in vehicle 10. Components that are similar or common with cycle 70 are given the same reference number for convenience.

In the cycle 200, the working fluid at point 130 may be controlled to be maintained at a pressure offset above the saturated pressure of the working fluid, and in one example, is maintained at 3-6 psi above the saturated pressure. If the pressure offset is too high, the cycle 200 may be too cold and take more heat to evaporate the working fluid, thereby reducing overall efficiency. If the pressure offset is too low, the cycle may not provide all of the working fluid as a liquid at point 130, which may cause vapor lock in the cycle 200.

The working fluid temperature at point 130 may be a temperature offset above the ambient temperature, or environmental temperature, and in one example the temperature of the working fluid at point 130 is at least 10° C. higher than the ambient temperature such that there is a sufficient temperature difference for the condenser 90 to effectively reject heat. As the ambient or environmental temperature constantly varies, it is not possible to control the condenser outlet temperature to a fixed setpoint temperature. For example, for an ambient temperature of 20° C., a system charged with R-134a may have a desired operating point 130 of 115 psi and 30° C. With a change in ambient temperature to 35° C., the desired operating point at 130 may be least 175 psi and 45° C. in order to convert the working fluid to liquid. With an environmental temperature of 0° C., the desired operating point at 130 may be about 64 psi and 10° C. to maintain the system's efficiency. A line 154 in FIG. 3 illustrates a line for the desired operating point 130 across a range of ambient temperature.

The cycle 200 in FIG. 4 provides for control over the operating conditions at point 130 and for the cycle by providing for control over the pressure of the working fluid in the cycle 200. Generally a working fluid chamber 202 is provided with a first control valve 204 connected to the inlet 206 of the pump 72 and a second control valve 208 connected to the outlet 210 of the pump 72. The chamber 202 is provided in a parallel flow configuration with the pump 72. The first valve 204 may be an upstream valve, and the second valve 208 may be a downstream valve.

The chamber 202 may be a reservoir with a fixed volume and fixed outer walls, for example a tank. The valves 204, 208 may be controlled between an open position and a closed position. In further examples, the valves 204, 208 may be controlled to an intermediate position to regulate or modulate flow. The valves 204, 208 may be mechanically, hydraulically, pneumatically, or electrically controlled. In one example, the valves are two port valves and are electromechanically actuated by a solenoid.

In one example, the pressure (P2) at the pump outlet 210 may be 2-4 times the pressure (P1) at the pump inlet 206, or the pump 72 has an operating pressure ratio (P2/P1) across it of 2-4. The chamber 202 may be pre-charged or charged with working fluid to a chamber pressure ($P_C$) between P1 and P2.

The valves 204, 208 are controlled using a controller 212. The controller 212 may be separate from or integrated with another controller, such as controller 96. The controller 212 may also be in communication with one or more sensors 214 that is positioned to measure temperature pressure of the working fluid at the pump inlet 206, and/or the environmental temperature. The controller 212 may also receive inputs from other system 200 or vehicle 10 sensors.

In a first example, when the environmental temperature increases, the system 200 pressure will also need to increase. The controller 212 receives a signal from the sensor 214 indicative of the pressure at the pump inlet 206, and also receives a signal from the sensor 214 indicative of the ambient temperature. If the controller 212 determines that the pressure P1 is less than a threshold pressure, for example, a pressure offset above the saturated vapor pressure for the associated temperature at 130, the controller 212 commands the first valve 204 to an open position and commands the second valve 208 to a closed position. The upstream or first valve 204 is opened to add working fluid from the chamber 202 to the system 200. The valve 208 remains closed. The working fluid in the chamber is at a higher pressure than the fluid at the pump inlet 206, so opening the valve 204 increases the pressure at the pump inlet, and leads to a corresponding higher pressure at the pump outlet.

In a second example, when the environmental temperature decreases, the system 200 pressure will also need to decrease. The controller 212 receives a signal from the sensor 214 indicative of the pressure at the pump inlet 206, and also receives a signal from the sensor 214 indicative of the ambient temperature. If the controller 212 determines that the pressure P1 is greater than a threshold pressure, for example, a pressure offset above the saturated vapor pressure for the associated temperature at 130, the controller 212 commands the first valve 204 to an closed position and commands the second valve 208 to a open position. The downstream or second valve 208 is opened to add working fluid from the system 200 to the chamber 202. The valve 204 remains closed. The working fluid in the chamber is at a lower pressure than the fluid at the pump outlet 210, so opening the valve 208 causes working fluid to flow into the chamber 202 and increase the pressure within the chamber while decreasing P2 at the pump outlet 210 and decreasing the system 200 pressure.

The controller 212 operates the valves 204, 208 to maintain a pressure of the fluid at a pump inlet at a threshold pressure or offset pressure above a saturated vapor pressure associated with a temperature at a condenser outlet when the ambient temperature varies. In one example, the threshold pressure is 3-6 psi, and the saturated vapor pressure is a pressure in region 124 associated with a temperature. Note that as temperature increases, the saturated vapor pressure also increases. As can be seen in FIG. 2, the saturated pressure stays a constant value for a given temperature across the dome 120. The controller 212 operates the system 200 such that the temperature of the condenser 90 outlet at point 130 is at an offset above the ambient temperature. The threshold pressure is a saturated vapor pressure of the working fluid plus a pressure offset. The saturated vapor pressure is a function of a temperature of the working fluid at an outlet of the condenser, or operating point 130. The temperature and the saturated vapor pressure vary with changes in ambient temperature.

Figure 5:
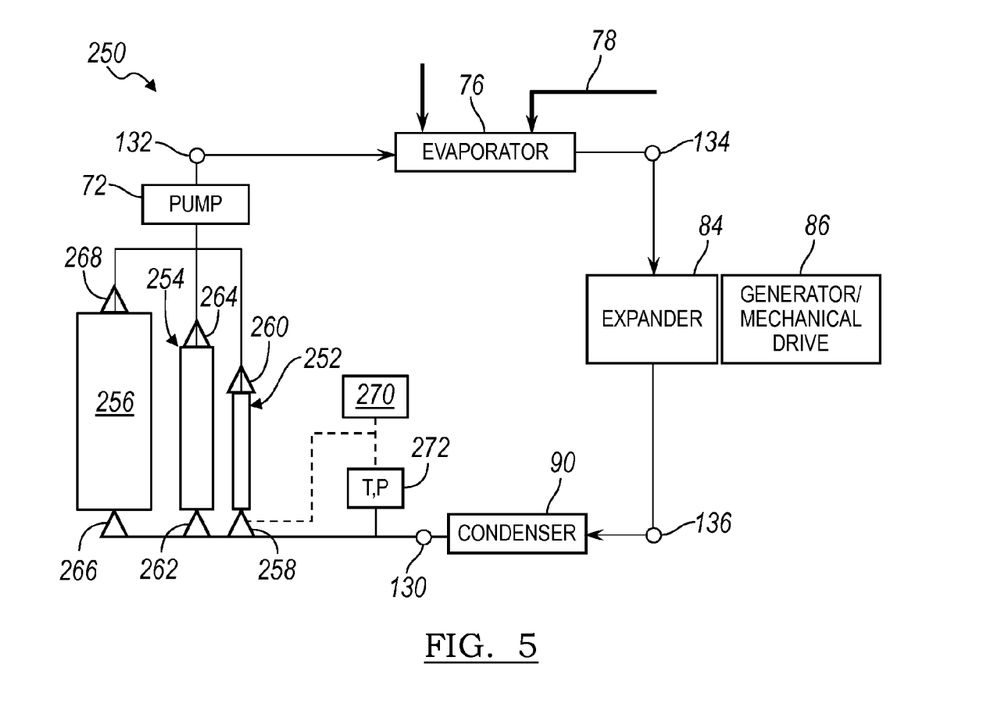
FIG. 5 illustrates a schematic of a simplified Rankine cycle with a pressure control device according to another embodiment.

FIG. 5 illustrates an example of a cycle for a vehicle that is configured for use in varying ambient temperatures. The cycle 250 is shown as a simplified cycle, and in one example may be a cycle 70 as described above and used in vehicle 10. Components that are similar or common with cycle 70 are given the same reference number for convenience.

In the cycle 250, the working fluid at point 130 may be controlled to be maintained at a pressure offset above the saturated pressure of the working fluid, and in one example, is maintained at 3-6 psi above the saturated pressure. If the pressure offset is too high, the cycle 250 may be too cold and take more heat to evaporate the working fluid, thereby reducing overall efficiency. If the pressure offset is too low, the cycle may not provide all of the working fluid as a liquid at point 130, which may cause vapor lock in the cycle 250.

The working fluid temperature at point 130 may be a temperature offset above the ambient temperature, or environmental temperature, and in one example the temperature of the working fluid at point 130 is at least 10° C. higher than the ambient temperature such that there is a sufficient temperature difference for the condenser 90 to effectively reject heat. As the ambient or environmental temperature constantly varies, it is not possible to control the condenser outlet temperature to a fixed setpoint temperature. For example, for an ambient temperature of 20° C., a system charged with R-134a may have a desired operating point 130 of 115 psi and 30° C. With a change in ambient temperature to 35° C., the desired operating point at 130 may be least 175 psi and 45° C. in order to convert the working fluid to liquid. With an environmental temperature of 0° C., the desired operating point at 130 may be about 64 psi and 10° C. to maintain the system's efficiency. A line 154 in FIG. 3 illustrates a line for the desired operating point 130 across a range of ambient temperature.

The cycle 250 in FIG. 5 provides for control over the operating conditions at point 130 and for the cycle by providing for control over the volume of the cycle 250. By controlling the volume of the cycle 250, the pressure is also controlled, as a lower volume is associated with a higher pressure. Generally, multiple chambers with associated control valves are arranged in a parallel flow configuration to provide different paths through the system 250 with different volumes. The control valves are used to control the flow path of the working fluid through one or more of the chambers. As the ambient or environmental temperature increases, the valves are controlled to direct the working fluid through a lower volume chamber to provide a lower volume cycle 250 and increase the pressure. As the ambient or environmental temperature decreases, the valves are controlled to direct the working fluid through a higher volume chamber to provide a higher volume cycle 250 and decrease the pressure.

In one example the system 250 has three chambers 252, 254, and 256 arranged in a parallel flow configuration. The first chamber 252 has an associated flow control valve 258 that is shown as being positioned upstream of the chamber 252. The chamber 252 may also have a second valve 260, which may be a flow control valve or a check valve. The second chamber 254 has an associated flow control valve 262 that is shown as being positioned upstream of the chamber 254. The chamber 254 may also have a second valve 264, which may be a flow control valve or a check valve. The third chamber 256 has an associated flow control valve 266 that is shown as being positioned upstream of the chamber 254. The chamber 256 may also have a second valve 268, which may be a flow control valve or a check valve.

The volumes of the chambers 252, 254, 256 may vary from one another, with chamber 252 having the smallest volume, chamber 256 having the largest volume, and chamber 254 having an intermediate volume between that of the first and third chambers 252, 256. In another example, the chambers 252, 254, 256 may have the same or similar volumes with the valving controlled to provide a flow of working fluid through one chamber or multiple chambers simultaneously. In a further example, some of the chambers may have similar volumes, while another chamber has a larger or smaller volume to provide various combinations of system volumes.

The valves 258, 262, 266 may be provided as individual valves or may be in a valve assembly with one inlet port and multiple outlet ports. Likewise, the valves 260, 264, 268 may be provided as individual valves or may be in a valve assembly with one inlet port and multiple outlet ports. An inlet manifold may be provided upstream of the chambers 252, 254, 256 and an outlet manifold may be provided downstream of the chambers 252, 254, 256.

In other examples, the system 250 has more or less than three chambers. The chambers may be positioned in various manners, for example, as separate and distinct chambers extending along three separate axes, or as concentric or nested chambers extending along a common axes, etc. The valves to the chambers may be controlled in various manners, for example, for flow of the working fluid through only one chamber at a time, or for flow of the working fluid through two or more chambers simultaneously to further increase the volume or provide a control over the volume in the system 250. Each chamber may have a fixed volume, thereby reducing the number of moving components, reducing weight, and reducing complexity in the system 250.

The valves 258, 262, 266 may each be controlled between an open position and a closed position. In further examples, the valves 258, 262, 266 may be controlled to an intermediate position to regulate or modulate flow. The valves 258, 262, 266 may be mechanically, hydraulically, pneumatically, or electrically controlled. In one example, the valves 258, 262, 266 are two port valves and are electromechanically actuated by a solenoid. In another example, the valves 258, 262, 266 are combined in a four port valve, with one inlet port and three outlet ports.

The valves 258, 262, 266 are controlled using a controller 270. The controller 270 may be separate from or integrated with another controller, such as controller 96. The controller 270 may also be in communication with one or more sensors 272 that are positioned to measure temperature and/or pressure of the working fluid at the pump inlet 206, and/or the environmental temperature. The controller 270 may also receive inputs from other system 250 or vehicle 10 sensors.

In a first example, the system 250 is operating with working fluid flowing through only the second chamber 254 such that valve 262 is open and valves 258, 266 are closed. When the environmental temperature increases, the system 250 pressure will also need to increase. The controller 270 receives a signal from the sensor 272 indicative of the pressure at the pump inlet (P1) or condenser outlet at point 130, and also receives a signal from the sensor 272 indicative of the ambient temperature. If the controller 270 determines that the pressure P1 is less than a threshold pressure, for example, a pressure offset above the saturated vapor pressure for the associated temperature at 130, the controller 270 commands the valve 258 to an open position and commands the valves 262, 266 to a closed position such that the working fluid now flows through only the first chamber 252 and the volume of the system 250 is decreased. The smaller volume of the chamber 252 and the system 250 causes an increase in pressure at the pump inlet, and leads to a corresponding higher pressure at the pump outlet and for the system 250.

In a second example, the system 250 is operating with working fluid flowing through only the second chamber 254 such that valve 262 is open and valves 258, 266 are closed. When the environmental temperature decreases, the system 250 pressure will also need to decrease. The controller 270 receives a signal from the sensor 272 indicative of the pressure at the pump inlet (P1) or condenser outlet at point 130, and also receives a signal from the sensor 272 indicative of the ambient temperature. If the controller 270 determines that the pressure P1 is greater than a threshold pressure, for example, a pressure offset above the saturated vapor pressure for the associated temperature at 130, the controller 270 commands the valve 266 to an open position and commands the valves 258, 262 to a closed position such that the working fluid now flows through only the third chamber 256 and the volume of the system 250 is increased. The larger volume of the chamber 256 and the system 250 causes a decrease in pressure at the pump inlet, and leads to a corresponding lower pressure at the pump outlet and for the system 250.

In a third example, the system 250 is operating with working fluid flowing through only the second chamber 254 such that valve 262 is open and valves 258, 266 are closed. When the environmental temperature decreases, the system 250 pressure will also need to decrease. The controller 270 receives a signal from the sensor 272 indicative of the pressure at the pump inlet (P1) or condenser outlet at point 130, and also receives a signal from the sensor 272 indicative of the ambient temperature. If the controller 270 determines that the pressure P1 is greater than a threshold pressure, for example, a pressure offset above the saturated vapor pressure for the associated temperature at 130, the controller 270 commands the valves 258, 262 to an open position and commands the valve 266 to a closed position such that the working fluid now flows through both the first and second chambers 252, 254 and the volume of the system 250 is increased. The larger combined volumes of the chambers 252, 254 and the system 250 causes an decrease in pressure at the pump inlet, and leads to a corresponding lower pressure at the pump outlet and for the system 250.

The controller 270 operates the valves 258, 262, 266 to vary the volume of the system 250 and maintain a pressure of the fluid at a pump inlet at a threshold pressure or offset pressure above a saturated vapor pressure associated with a temperature at a condenser outlet when the ambient temperature varies. In one example, the threshold pressure is 3-6 psi, and the saturated vapor pressure is a pressure in region 124 associated with a temperature. Note that as temperature increases, the saturated vapor pressure also increases. As can be seen in FIG. 2, the saturated pressure stays a constant value for a given temperature across the dome 120. The controller 270 operates the system 250 such that the temperature of the condenser 90 outlet at point 130 is at an offset above the ambient temperature. The threshold pressure is a saturated vapor pressure of the working fluid plus a pressure offset. The saturated vapor pressure is a function of a temperature of the working fluid at an outlet of the condenser, or operating point 130. The temperature and the saturated vapor pressure vary with changes in ambient temperature.

Various examples of the present disclosure have associated, non-limiting advantages. For example, a thermodynamic cycle in a vehicle may be used to recover waste heat and energy and increase vehicle efficiency. The thermodynamic cycle may be a Rankine cycle. The vehicle operates in varying ambient conditions, and these ambient conditions, e.g. ambient or environmental temperature, may rapidly change over a wide range of temperatures. The operating conditions of the thermodynamic cycle may need to be modified as the ambient conditions change to maintain efficient operation of the cycle. For example, the temperature of the working fluid at the outlet of the condenser is a temperature above the ambient temperature, and the pressure of the working fluid at the condenser outlet (pump inlet) is at a pressure offset above the saturated vapor pressure associated with the temperature at the condenser outlet. In one example, the cycle has a pressure chamber or reservoir positioned in parallel with the pump and fluidly connected to the pump inlet and outlet by respective valves. By controlling the valves, the pressure in the cycle may be increased or decreased to account for changes in ambient temperature.

In one example, the cycle has a plurality of chamber positioned in parallel with one another and upstream of the pump, with one or more valves to control the flow of the working fluid through each of the chambers. By controlling the valves, the volume may be increased or decreased to provide a decreased or increased pressure of the cycle, respectively, and to account for changes in ambient temperature.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a vehicle system having a waste heat fluid;
   an expander, a condenser, a pump, and an evaporator in sequential fluid communication in a thermodynamic cycle containing a working fluid, the evaporator configured to transfer heat from the waste heat fluid to the working fluid;
   a plurality of chambers arranged in parallel fluid connection and positioned between the condenser and the pump;
   at least one valve in fluid communication with the plurality of chambers and configured to selectively control flow of the working fluid between the plurality of chambers; and
   a controller configured to control the at least one valve to vary a volume of the thermodynamic cycle such that a pressure of the working fluid at an inlet to the pump is at a threshold pressure, the threshold pressure being a saturated vapor pressure of the working fluid plus a pressure offset, wherein the saturated vapor pressure is a function of a temperature of the working fluid at an outlet of the condenser, the temperature and the saturated vapor pressure varying with ambient temperature.

2. The vehicle of claim 1 wherein a first chamber of the plurality of chambers has a first volume, and a second chamber of the plurality of chambers has a second volume greater than the first volume.

3. The vehicle of claim 2 further comprising a pressure sensor in fluid communication with the inlet to the pump;
   wherein the controller is further configured to receive a signal from the pressure sensor indicative of the pressure of the working fluid at the inlet to the pump, and control the at least one valve to provide flow of the working fluid through the first chamber when the pressure is less than the threshold pressure to decrease the volume of the thermodynamic cycle and provide an increase in pressure at the inlet to the pump.

4. The vehicle of claim 2 further comprising a pressure sensor in fluid communication with the inlet to the pump;
   wherein the controller is further configured to receive a signal from the pressure sensor indicative of the pressure of the working fluid at the inlet to the pump, and control the at least one valve to provide flow of the working fluid through the second chamber when the pressure is greater than the threshold pressure to increase the volume of the thermodynamic cycle and provide a decrease in pressure at the inlet to the pump.

5. The vehicle of claim 2 wherein a third chamber of the plurality of chambers has a third volume greater than the second volume; and wherein the at least one valve comprises a valve associated with each chamber of the plurality of chambers.

6. A method comprising:

controlling a pump, an evaporator, an expander, and a condenser in a closed loop in a vehicle for energy recovery using a mixed phase working fluid;

controlling a first valve to a first chamber adjacent to the pump to maintain a pressure of the mixed phase working fluid at a pump inlet at a threshold pressure above a saturated vapor pressure associated with a temperature at a condenser outlet when ambient temperature varies, the first chamber positioned between the first valve and the pump inlet; and controlling a second valve to maintain the pressure of the mixed phase working fluid at the pump inlet at the threshold pressure when ambient temperature varies, the second valve adjacent to the pump and controlling flow through a second chamber positioned between the second valve and the pump inlet, the second chamber in parallel fluid connection with the first chamber, the second chamber having a greater volume than the first chamber; and the steps of controlling the first and second valves maintains the pressure of the mixed phase working fluid at the pump inlet by varying a volume of the closed loop.

7. The method of claim 6 wherein the threshold pressure is maintained at a pressure offset above the saturated vapor pressure.

8. The method of claim 6 wherein the temperature of the condenser outlet is at an offset above ambient temperature; and wherein the saturated vapor pressure increases with a temperature increase of the mixed phase working fluid at the condenser outlet.

9. The method of claim 6 further comprising transferring heat to the mixed phase working fluid in the evaporator from a waste heat fluid in the vehicle thereby providing a vapor phase of the fluid;

rotating the expander using the vapor phase of the mixed phase working fluid to generate power;

transferring heat from the mixed phase working fluid in the condenser to ambient air thereby providing a liquid phase of the mixed phase working fluid; and pumping the liquid phase of the mixed phase working fluid using the pump.

10. The method of claim 6 further comprising:

receiving a signal from a pressure sensor in fluid communication with the pump inlet that the pressure is less than the threshold pressure; and opening the first valve and closing the second valve to decrease the volume of the closed loop thereby increasing pressure at the pump inlet.

11. The method of claim 6 further comprising:

receiving a signal from a pressure sensor in fluid communication with the pump inlet that the pressure is greater than the threshold pressure; and closing the first valve and opening the second valve to increase volume of the closed loop thereby lowering pressure at the pump inlet.

12. The method of claim 6 further comprising:

receiving a signal from a pressure sensor in fluid communication with the pump inlet that the pressure is greater than the threshold pressure; and controlling the first and second valves to selectively control flow of the mixed phase working fluid to at least one of first and second chambers to increase a volume of the closed loop thereby decreasing pressure at the pump inlet, each chamber receiving the mixed phase working fluid from the condenser outlet and providing the mixed phase working fluid to the pump inlet.

13. A method comprising:

controlling upstream and downstream valve assemblies of first and second fluidly parallel chambers to selectively control flow therethrough thereby varying a volume of a closed loop having a pump, an evaporator, an expander, and a condenser sequentially connected thereto for vehicle waste heat energy recovery using a mixed phase working fluid to maintain pump inlet pressure above a saturated vapor pressure associated with a condenser outlet temperature as ambient temperature varies.

14. The method of claim 13 wherein, in response to a decreasing pump inlet pressure, the upstream and downstream valve assemblies are controlled to provide flow through only the first chamber to decrease the volume of the closed loop.

15. The method of claim 14 wherein, in response to an increasing pump inlet pressure, the upstream and downstream valve assemblies are controlled to provide flow through both the first and second chambers to increase the volume of the closed loop.

16. The method of claim 14 wherein a volume of the first chamber is less than a volume of the second chamber; and wherein, in response to an increasing pump inlet pressure, the upstream and downstream valve assemblies are controlled to provide flow through only the second chamber to increase the volume of the closed loop.

* * * * *